US006593384B2

(12) United States Patent
Anderson et al.

(10) Patent No.: US 6,593,384 B2
(45) Date of Patent: Jul. 15, 2003

(54) POLYMER FOAM PROCESSING WITH LOW BLOWING AGENT LEVELS

(75) Inventors: Jere R. Anderson, Newburyport, MA (US); Kelvin T. Okamoto, Boston, MA (US); Kent G. Blizard, Ashland, MA (US)

(73) Assignee: Trexel, Inc., Woburn, MA (US)

( * ) Notice: Subject to any disclaimer, the term of this patent is extended or adjusted under 35 U.S.C. 154(b) by 63 days.

(21) Appl. No.: 09/732,366

(22) Filed: Dec. 7, 2000

(65) Prior Publication Data

US 2001/0047042 A1 Nov. 29, 2001

Related U.S. Application Data

(63) Continuation-in-part of application No. 09/579,080, filed on May 25, 2000.

(51) Int. Cl.[7] .................................................. C08J 9/00
(52) U.S. Cl. ........................... 521/97; 521/79; 521/142
(58) Field of Search ............................. 521/79, 97, 142

(56) References Cited

U.S. PATENT DOCUMENTS

| 4,229,395 | A | | 10/1980 | Nagumo et al. |
|---|---|---|---|---|
| 4,473,665 | A | * | 9/1984 | Martini-Vvedensky et al. |
| 5,034,171 | A | * | 7/1991 | Kicek et al. |
| 5,158,986 | A | * | 10/1992 | Cha et al. |
| 5,160,674 | A | | 11/1992 | Colton et al. |
| 5,334,356 | A | | 8/1994 | Baldwin et al. |
| 5,670,102 | A | * | 9/1997 | Perman et al. |
| 5,866,053 | A | | 2/1999 | Park et al. |
| 5,912,278 | A | * | 6/1999 | Vvenkataraman |
| 6,005,013 | A | * | 12/1999 | Suh et al. |
| 6,051,174 | A | | 4/2000 | Park et al. |
| 6,127,440 | A | * | 10/2000 | Sanyasi |
| 6,169,122 | B1 | | 1/2001 | Blizard et al. |
| 6,235,380 | B1 | | 5/2001 | Tupil et al. |
| 6,284,810 | B1 | | 9/2001 | Burnham et al. |
| 6,322,347 | B1 | | 11/2001 | Xu |
| 6,376,059 | B1 | | 4/2002 | Anderson et al. |
| 6,231,942 | B1 | * | 5/2002 | Blizard et al. |

FOREIGN PATENT DOCUMENTS

| EP | 0 914 919 A1 | 5/1999 |
|---|---|---|
| EP | 0 972 626 A2 | 1/2000 |
| WO | WO 98/08667 | 3/1998 |
| WO | WO 98/31521 | 7/1998 |
| WO | WO 99/32544 | 7/1999 |

* cited by examiner

Primary Examiner—Morton Foelak
(74) Attorney, Agent, or Firm—Wolf, Greenfield & Sacks, P.C.

(57) ABSTRACT

Systems and techniques for forming microcellular polymeric material, via injection molding, blow molding, continuous extrusion, or the like, at very low blowing agent levels, are described. The invention involves, in one aspect, the discovery of a region of very low blowing agent level where, surprisingly, microcellular material can be formed. Articles with particularly good surface properties are provided.

86 Claims, 5 Drawing Sheets

POLYMER FOAM PROCESSING WITH LOW BLOWING AGENT LEVELS

RELATED APPLICATIONS

This application is a continuation-in-part of U.S. patent application Ser. No. 09/579,080, filed May 25, 2000.

FIELD OF THE INVENTION

The present invention relates generally to polymer foam processing, and more particularly to formation of microcellular and other polymeric foams with extremely low levels of blowing agent.

BACKGROUND OF THE INVENTION

Polymeric foams include a plurality of voids, also called cells, in a polymer matrix. By replacing solid plastic with voids, polymeric foams use less raw material than solid plastics for a given volume. Thus, by using polymeric foams instead of solid plastics, material costs can be reduced in many applications.

Microcellular foams have smaller cell sizes and higher cell densities than conventional polymeric foams. Several patents and patent publications describe aspects of microcellular materials and microcellular processes.

U.S. Pat. No. 4,473,665 (Martini-Vvedensky, et al.; Sep. 25, 1984) describes a process for making foamed polymer having cells less than about 100 microns in diameter. In the technique of Martini-Vvedensky, et al., a material precursor is saturated with a blowing agent, the material is placed under high pressure, and the pressure is rapidly dropped to nucleate the blowing agent and to allow the formation of cells. The material then is frozen rapidly to maintain a desired distribution of microcells.

U.S. Pat. No. 5,158,986 (Cha, et al.; Oct. 27, 1992) describes formation of microcellular polymeric material using a supercritical fluid as a blowing agent. In a batch process of Cha, et al., a plastic article is submerged at pressure in supercritical fluid for a period of time, and then quickly returned to ambient conditions creating a solubility change and nucleation. In a continuous process, a polymeric sheet is extruded, which can be run through rollers in a container of supercritical fluid at high pressure, and then exposed quickly to ambient conditions. In another continuous process, a supercritical fluid-saturated molten polymeric stream is established. The polymeric stream is rapidly heated, and the resulting thermodynamic instability (solubility change) creates sites of nucleation, while the system is maintained under pressure preventing significant growth of cells. The material then is injected into a mold cavity where pressure is reduced and cells are allowed to grow.

U.S. Pat. No. 5,866,053 (Park, et al.; Feb. 2, 1999) describes a continuous process for forming microcellular foam. The pressure on a single-phase solution of blowing agent and polymer is rapidly dropped to nucleate the material. The nucleation rate is high enough to form a microcellular structure in the final product.

International patent publication no. WO 98/08667 (Burnham et al.) provides methods and systems for producing microcellular material, and microcellular articles. In one method of Burnham et al. a fluid, single phase solution of a precursor of foamed polymeric material and a blowing agent is continuously nucleated by dividing the stream into separate portions and separately nucleating each of the separate portions. The divided streams can be recombined. The recombined stream may be shaped into a desired form, for example by a shaping die. Burnham et al. also describes a variety of dies, nucleators, and other arrangements for making thin articles, thick articles, extruding microcellular material onto wire, etc. In some of the methods, pressure drop rate is an important feature and techniques to control this and other parameters are described.

Foam processes, in some cases, incorporate nucleating agents, some of which are inorganic solid particles, into the polymer melt during processing. These agents can be of a variety of compositions, such as talc and calcium carbonate, and are incorporated into the polymer melt typically to promote cell nucleation. The dispersion of nucleating agents within the polymer mixture is often times critical in forming a uniform cell structure.

Blowing agents typically are introduced into polymeric material to make polymer foams in one of two ways. According to one technique, a chemical blowing agent is mixed with a polymer. The chemical blowing agent undergoes a chemical reaction in the polymeric material, typically under conditions in which the polymer is molten, causing formation of a gas. Chemical blowing agents generally are low molecular weight organic compounds that decompose at a particular temperature and release a gas such as nitrogen, carbon dioxide, or carbon monoxide. According to another technique a physical blowing agent, i.e., a fluid that is a gas under ambient conditions, is injected into a molten polymeric stream to form a mixture. The mixture is subjected to a pressure drop, causing the blowing agent to expand and form bubbles (cells) in the polymer.

International patent publication no. WO 98/08667 of Burnham, et al., published Mar. 5, 1998, employing supercritical blowing agents present at a variety of levels; International patent publication no. WO 98/31521 of Pierick, et al., published Jul. 23, 1998 describes injection molding of microcellular material, and International patent publication no. WO 99/62554 of Anderson, et al., published Jul. 1, 1999 describes microcellular extrusion/blow molding processes and articles, each reference describing the use of supercritical blowing agents at a variety of levels.

It is generally accepted in the field that to create enough nucleation sites to form microcellular foams, one must use a combination of sufficient blowing agent to create a driving force for nucleation, and a high enough pressure drop rate to prevent cell growth from dominating the nucleation event. As blowing agent levels are lowered, the driving force for nucleation decreases. Yet, while higher blowing agent levels can lead to smaller cells (a generally desirable result in the field of microcellular foams), according to conventional thought higher blowing agent levels also can cause cell interconnection (which by definition increases cell size and can compromise structural and other material properties) and less-than-optimal surface properties (compromised surface properties at higher gas levels can result from the natural tendency of the blowing agent to diffuse out of the material).

That is, it is generally accepted that there is a trade off between small cell size and optimal material properties as blowing agent levels in microcellular polymeric material are altered. It is one object of the invention to obviate this tradeoff.

SUMMARY OF THE INVENTION

The present invention provides techniques for forming microcellular polymeric articles using low levels of blowing agent. In one embodiment the invention provides a method for forming a microcellular article that involves conveying polymeric material in a downstream direction in a polymer processing apparatus. A blowing agent is introduced into the polymeric material and a mixture of the polymeric material and blowing agent is created. The blowing agent is selected among those that are gases at ambient conditions, and is added in an amount of less than about 0.08% by weight in the mixture.

Other embodiments involve significantly lower levels of blowing agent. Preferably a physical blowing agent is used, i.e. not a blowing agent formed via chemical reaction.

In preferred embodiments, a single-phase solution of blowing agent and polymeric material is created, and is nucleated by being subjected to conditions of solubility change via a rapid pressure drop. Blowing agent can be intimately mixed into the polymeric material by being introduced through many orifices of an extrusion barrel.

Microcellular material having cells of a variety of size can be formed, including various small cells. Product of a variety of weight reduction (void volumes) can be formed.

Articles can be produced by continuously extruding microcellular polymeric material, by injection molding the material, blow-molding, etc. Articles can be thermoformed after formation.

Invention also includes articles having particularly smooth surfaces, and techniques for producing these articles.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION OF THE INVENTION

Figure 1:
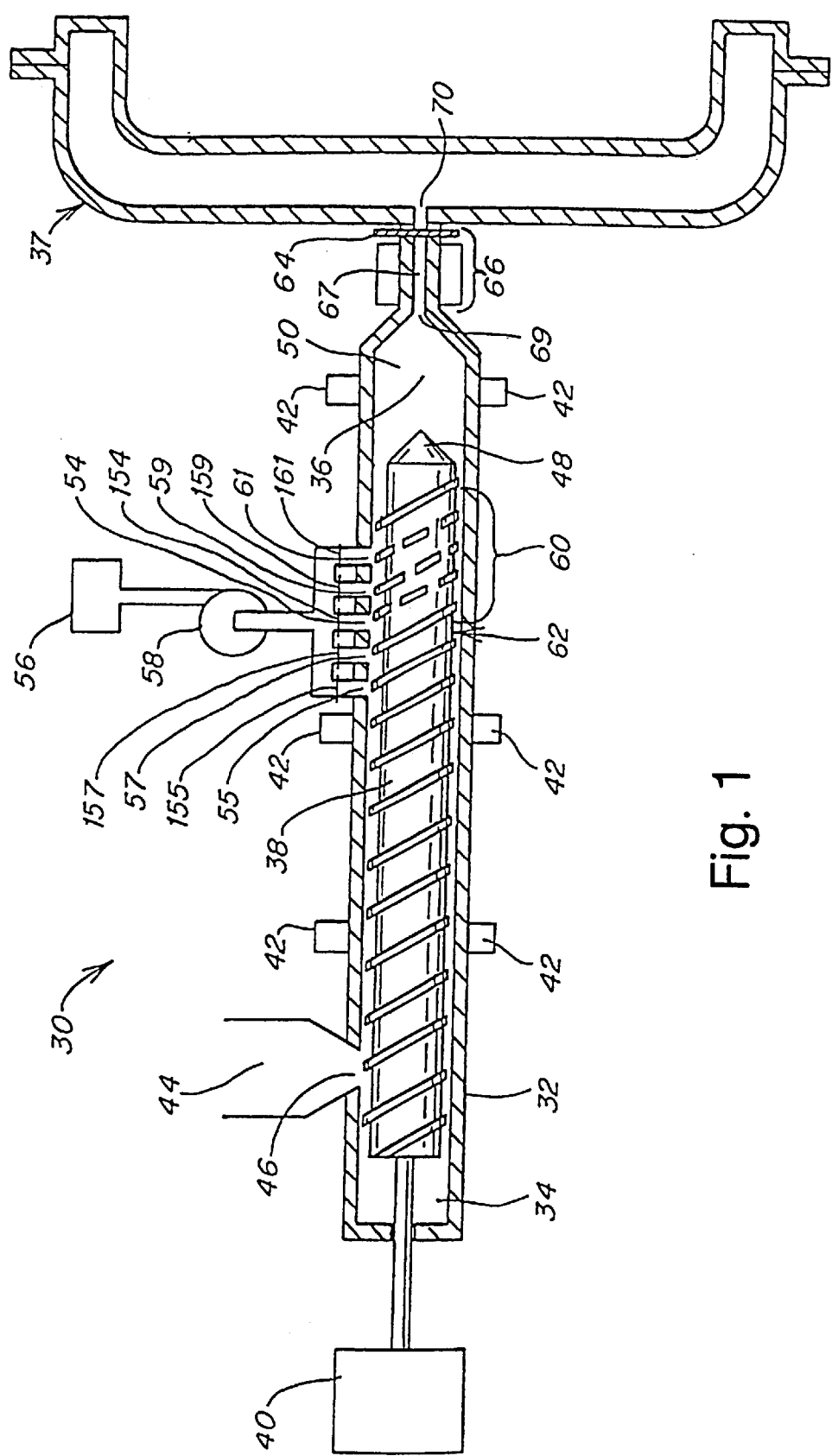
FIG. 1 illustrates a microcellular injection or intrusion molding system representing one arrangement for use with low blowing agent levels according to the invention.

International Pat. Pubs. WO 98/08667 of Burnham, et al., published Mar. 5, 1998; WO 98/31521 of Pierick, et al., published Jul. 23, 1998; and WO 99/62554 of Anderson, et al., published Jul. 1, 1999 and U.S. Pat. application Ser. No. U.S. application Ser. No.: 09/335,946 of Pierick, et al. filed Jun. 18, 1999 and entitled, "Injection Molding of Polymeric Material" each are incorporated herein by reference.

The present invention involves the surprising discovery that microcellular polymeric foams can be formed via extrusion, injection molding, or the like with the use of physical blowing agents at extremely low levels, avoiding certain disadvantages that can accompany higher blowing agent levels normally associated with production of material with very small cells.

The various embodiments and aspects of the invention will be better understood from the following definitions. As used herein, "nucleation" defines a process by which a homogeneous, single-phase solution of polymeric material, in which is dissolved molecules of a species that is a gas under ambient conditions, undergoes formations of clusters of molecules of the species that define "nucleation sites", from which cells will grow. That is, "nucleation" means a change from a homogeneous, single-phase solution to a mixture in which sites of aggregation of at least several molecules of blowing agent are formed. Nucleation defines that transitory state when gas, in solution in a polymer melt, comes out of solution to form a suspension of bubbles within the polymer melt. Generally this transition state is forced to occur by changing the solubility of the polymer melt from a state of sufficient solubility to contain a certain quantity of gas in solution to a state of insufficient solubility to contain that same quantity of gas in solution. Nucleation can be effected by subjecting the homogeneous, single-phase solution to rapid thermodynamic instability, such as rapid temperature change, rapid pressure drop, or both. Rapid pressure drop can be created using a nucleating pathway, defined below. Rapid temperature change can be created using a heated portion of an extruder, a hot glycerine bath, or the like.

"Microcellular nucleation", as used herein, means nucleation at a cell density high enough to create microcellular material upon controlled expansion.

A "nucleating agent" is a dispersed agent, such as talc or other filler particles, added to a polymer and able to promote formation of nucleation sites from a single-phase, homogeneous solution. Thus "nucleation sites" do not define locations, within a polymer, at which nucleating agent particles reside.

"Nucleated" refers to a state of a fluid polymeric material that had contained a single-phase, homogeneous solution including a dissolved species that is a gas under ambient conditions, following an event (typically thermodynamic instability) leading to the formation of nucleation sites. "Non-nucleated" refers to a state defined by a homogeneous, single-phase solution of polymeric material and dissolved species that is a gas under ambient conditions, absent nucleation sites. A "non-nucleated" material can include nucleating agent such as talc.

A "polymeric material/blowing agent mixture" can be a single-phase, non-nucleated solution of at least the two, a nucleated solution of at least the two, or a mixture in which blowing agent cells have grown.

"Nucleating pathway" is meant to define a pathway that forms part of microcellular polymeric foam extrusion apparatus and in which, under conditions in which the apparatus is designed to operate (typically at pressures of from about 1500 to about 30,000 psi upstream of the nucleator and at flow rates of greater than about 10 pounds polymeric material per hour), the pressure of a single-phase solution of polymeric material admixed with blowing agent in the system drops below the saturation pressure for the particular blowing agent concentration at a rate or rates facilitating rapid nucleation. A nucleating pathway defines, optionally with other nucleating pathways, a nucleation or nucleating region of a device of the invention.

The present invention provides techniques for production of microcellular material via extrusion, injection or intrusion molding, blow molding, or the like, including microcellular polymeric material, using very low levels of blowing agent. The invention can be modified readily by those of ordinary skill in the art for use in other molding methods such as, without limitation, low-pressure molding, co-injection molding, laminar molding, injection compression, and the like.

For purposes of the present invention, microcellular material is defined as foamed material having an average cell size of less than about 100 microns in diameter, or material of cell density of generally greater than at least about $10^6$ cells per cubic centimeter, or preferably both. Non-microcellular foams have cell sizes and cell densities outside of these ranges. The void fraction of microcellular material generally varies from 5% to 98%. Supermicrocellular material is defined for purposes of the invention by cell sizes smaller than 1 µm and cell densities greater than $10^{12}$ cells per cubic centimeter.

In preferred embodiments, microcellular material of the invention is produced having average cell size of less than about 50 microns. In some embodiments particularly small cell size is desired, and in these embodiments material of the invention has average cell size of less than about 20 microns, more preferably less than about 10 microns, and more preferably still less than about 5 microns. The microcellular material preferably has a maximum cell size of about 100 microns. In embodiments where particularly small cell size is desired, the material can have maximum cell size of about 50 microns, more preferably about 25 microns, more preferably about 15 microns, more preferably about 8 microns, and more preferably still about 5 microns. Microcellular material of the invention preferably has a void volume of at least about 5%, more preferably at least about 10%, and can have void volume of at least about 15%, 20%, or even 25%, 30%, 50%, or 70% in some embodiments. A set of embodiments includes all combinations of these noted average cell sizes, maximum cell sizes, and/or void volumes. For example, one embodiment in this set of embodiments includes microcellular material having an average cell size of less than about 30 microns with a maximum cell size of about 50 microns and void volume of at least about 30%, and as another example an average cell size of less than about 30 microns with a maximum cell size of about 35 microns, etc. That is, microcellular material designed for a variety of purposes can be produced having a particular combination of average cell size and a maximum cell size preferable for that purpose.

In one embodiment, essentially closed-cell microcellular material is produced in accordance with the techniques of the present invention. As used herein, "essentially closed-cell" is meant to define material that, at a thickness of about 100 microns, contains no connected cell pathway through the material.

Referring now to FIG. 1, a molding system 30 is illustrated schematically that can be used to form microcellular material according to one embodiment of the invention. It is to be understood that the molding system 30 of FIG. 1 is but one exemplary polymer processing apparatus that can be used to form microcellular material at low blowing agent levels in accordance with the invention. Other exemplary systems include continuous extrusion and blow-molding apparatus as described in the above-referenced international patent publications. System 30 of FIG. 1 includes a barrel 32 having a first, upstream end 34, and a second, downstream end 36 connected to a molding chamber 37. Mounted for rotation within barrel 32 is a screw 38 operably connected, at its upstream end, to a drive motor 40. Although not shown in detail, screw 38 includes feed, transition, gas injection, mixing, and metering sections.

Positioned along barrel 32, optionally, are temperature control units 42. Control units 42 can be electrical heaters, can include passageways for temperature control fluid, and or the like. Units 42 can be used to heat a stream of pelletized or fluid polymeric material within the barrel to facilitate melting, and/or to cool the stream to control viscosity and, in some cases, blowing agent solubility. The temperature control units can operate differently at different locations along the barrel, that is, to heat at one or more locations, and to cool at one or more different locations. Any number of temperature control units can be provided.

Barrel 32 is constructed and arranged to receive a precursor of polymeric material. As used herein, "precursor of polymeric material" is meant to include all materials that are fluid, or can form a fluid and that subsequently can harden to form a microcellular polymeric article. Typically, the precursor is defined by thermoplastic polymer pellets, but can include other species. For example, in one embodiment the precursor can be defined by species that will react to form microcellular polymeric material as described, under a variety of conditions. The invention is meant to embrace production of microcellular material from any combination of species that together can react to form a polymer, typically monomers or low-molecular-weight polymeric precursors which are mixed and foamed as the reaction takes place. In general, species embraced by the invention include thermosetting polymers in which a significant increase in molecular weight of the polymer occurs during reaction, and during foaming, due to crosslinking of polymeric components. For example, polyamides of the condensation and addition type, including aliphatic and aromatic polyamides such as polyhexamethyleneadipamide, poly(e-caprolactam), polyenes such as cycloaromatic polymers including polydicyclopentadiene, acrylic polymers such as polyacrylamide, polyacrylamate, acrylic ester polymers such as 2-cyanoacrylic ester polymers, acrylonitrile polymers, and combinations.

Preferably, a thermoplastic polymer or combination of thermoplastic polymers is selected from among amorphous, semicrystalline, and crystalline material including polyolefins such as polyethylene and polypropylene, fluoropolymers, cross-linkable polyolefins, polyamides, polyvinyl chloride, and polyaromatics such as styrenic polymers including polystyrene. Thermoplastic elastomers can be used as well, especially metallocene-catalyzed polyethylene.

Typically, introduction of the precursor of polymeric material utilizes a standard hopper 44 for containing pelletized polymeric material, optionally containing nucleating agent, to be fed into the extruder barrel through orifice 46, although a precursor can be a fluid prepolymeric material injected through an orifice and polymerized within the barrel via, for example, auxiliary polymerization agents. In connection with the present invention, it is important only that a fluid stream of polymeric material be established in the system.

Immediately downstream of downstream end 48 of screw 38 in FIG. 1 is a region 50 which can be a temperature adjustment and control region, auxiliary mixing region, auxiliary pumping region, or the like. For example, region 50 can include temperature control units to adjust the temperature of a fluid polymeric stream prior to nucleation, as described below. Region 50 can include instead, or in addition, additional, standard mixing units (not shown), or a flow-control unit such as a gear pump (not shown). In another embodiment, region 50 can be replaced by a second screw in tandem which can include a cooling region. In an embodiment in which screw 38 is a reciprocating screw in an injection molding system, region 50 can define an accumulation region in which a single-phase, non-nucleated solution of polymeric material and a blowing agent is accumulated prior to injection into mold 37.

Microcellular material production according to the present invention preferably uses a physical blowing agent, that is, an agent that is a gas under ambient conditions (described more fully below). However, chemical blowing agents can be used and can be formulated with polymeric pellets introduced into hopper 44. Suitable chemical blowing agents include those typically relatively low molecular weight organic compounds that decompose at a critical temperature or another condition achievable in extrusion and release a gas or gases such as nitrogen, carbon dioxide, or carbon monoxide. Examples include azo compounds such as azo dicarbonamide.

One advantage of embodiments in which a physical blowing agent, rather than a chemical blowing agent, is used is that recycleability of product is maximized. Use of a chemical blowing agent typically reduces the attractiveness of a polymer to recycling since residual chemical blowing agent and blowing agent by-products contribute to an overall non-uniform recyclable material pool. Since foams blown with chemical blowing agents inherently include a residual, unreacted chemical blowing agent after a final foam product has been produced, as well as chemical by-products of the reaction that forms a blowing agent, material of the present invention in this set of embodiments includes residual chemical blowing agent, or reaction by-product of chemical blowing agent, in an amount less than that inherently found in articles blown with 0.1% by weight chemical blowing agent or more, preferably in an amount less than that inherently found in articles blown with 0.05% by weight chemical blowing agent or more, and more preferably still in an amount less than that inherently found in articles blown with 0.01% by weight chemical blowing agent or more. In particularly preferred embodiments, the material is characterized by being essentially free of residual chemical blowing agent or free of reaction by-products of chemical blowing agent. That is, they include less residual chemical blowing agent or by-product that is inherently found in articles blown with any chemical blowing agent.

Where physical blowing agents are used, along barrel 32 of system 30 is at least one port 54 in fluid communication with a source 56 of a physical blowing agent. Any of a wide variety of physical blowing agents known to those of ordinary skill in the art such as helium, hydrocarbons, chlorofluorocarbons, nitrogen, carbon dioxide, and the like can be used in connection with the invention, or mixtures thereof, and, according to a preferred embodiment, source 56 provides carbon dioxide as a blowing agent. Supercritical fluid blowing agents are especially preferred, in particular supercritical carbon dioxide. In one embodiment solely supercritical carbon dioxide is used as blowing agent. Supercritical carbon dioxide (or other supercritical blowing agent) can be introduced into the extruder and made to form rapidly a single-phase solution with the polymeric material either by injecting carbon dioxide or other blowing agent as a supercritical fluid, or injecting carbon dioxide as a gas or liquid and allowing conditions within the extruder to render the blowing agent supercritical, in many cases within seconds. Injection of carbon dioxide into the extruder in a supercritical state is preferred. The single-phase solution of supercritical carbon dioxide and polymeric material formed in this manner has a very low viscosity which advantageously allows lower temperature molding, as well as rapid filling of molds having close tolerances to form very thin molded parts, which is discussed in greater detail below. According to the invention blowing agent is introduced into polymeric material within polymer processing apparatus 30 in an amount of less than about 0.08% by weight or other, lower percentages as described below.

A pressure and metering device 58 typically is provided between blowing agent source 56 and that at least one port 54. Device 58 can be used to meter the mass of the blowing agent between 0.01 lbs/hour and 70 lbs/hour, or between 0.04 lbs/hour and 70 lbs/hour, and more preferably between 0.2 lbs/hour and 12 lbs/hour so as to control the amount of the blowing agent in the polymeric stream within the extruder to maintain blowing agent at a desired level.

Although port 54 can be located at any of a variety of locations along the barrel, according to a preferred embodiment it is located just upstream from a mixing section 60 of the screw and at a location 62 of the screw where the screw includes unbroken flights.

Figure 2:
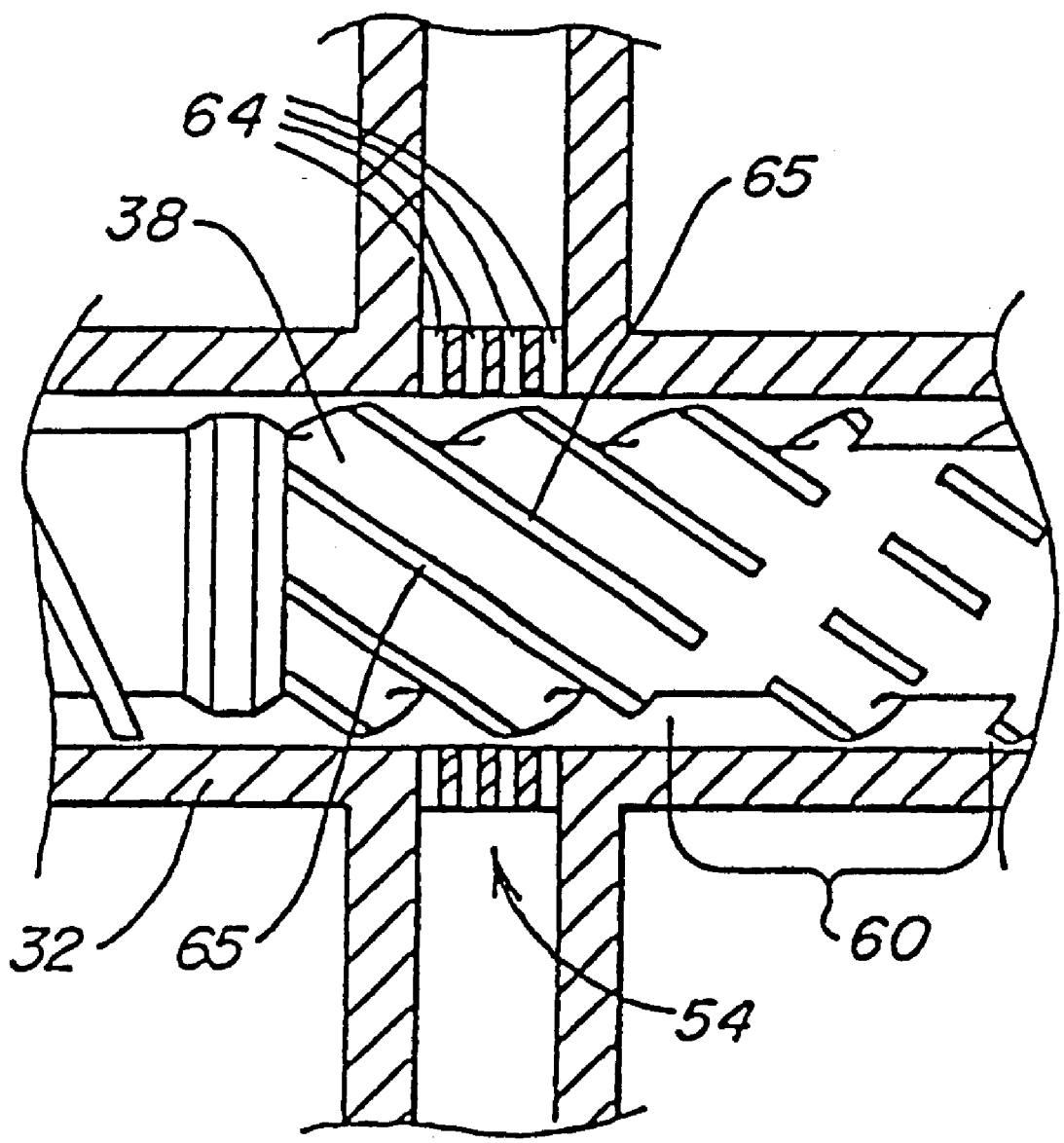
FIG. 2 illustrates a preferred multi-hole blowing agent feed orifice arrangement and extrusion screw for use with the system of FIG. 1.

Referring now to FIG. 2, a preferred embodiment of the blowing agent port is illustrated in greater detail. In the specific, exemplary embodiment illustrated two ports on opposing top and bottom sides of the barrel are provided. In this preferred embodiment, port 54 is located at a region upstream from mixing section 60 of screw 38 (including highly-broken flights) at a distance upstream of the mixing section of no more than about 4 full flights, preferably no more than about 2 full flights, or no more than 1 full flight. Positioned as such, injected blowing agent is very rapidly and evenly mixed into a fluid polymeric stream to quickly produce a single-phase solution of the foamed material precursor and the blowing agent.

Port 54, in the preferred embodiment illustrated, is a multi-hole port including a plurality of orifices 64 connecting the blowing agent source with the extruder barrel. As shown, in preferred embodiments a plurality of ports 54 are provided about the extruder barrel at various positions radially and can be in alignment longitudinally with each other. For example, a plurality of ports 54 can be placed at the 12 o'clock, 3 o'clock, 6 o'clock, and 9 o'clock positions about the extruder barrel, each including multiple orifices 64. In this manner, where each orifice 64 is considered a blowing agent orifice, the invention includes extrusion apparatus having at least about 10, preferably at least about 40, more preferably at least about 100, more preferably at least about 300, more preferably at least about 500, and more preferably still at least about 700 blowing agent orifices in fluid communication with the extruder barrel, fluidly connecting the barrel with a source of blowing agent.

Also in preferred embodiments is an arrangement (as shown in FIG. 2) in which the blowing agent orifice or orifices are positioned along the extruder barrel at a location where, when a preferred screw is mounted in the barrel, the orifice or orifices are adjacent full, unbroken flights 65. In this manner, as the screw rotates, each flight, passes, or "wipes" each orifice periodically. This wiping increases rapid mixing of blowing agent and fluid foamed material precursor by, in one embodiment, essentially rapidly opening and closing each orifice by periodically blocking each orifice, when the flight is large enough relative to the orifice to completely block the orifice when in alignment therewith. The result is a distribution of relatively finely-divided, isolated regions of blowing agent in the fluid polymeric material immediately upon injection and prior to any mixing. In this arrangement, at a standard screw revolution speed of about 30 rpm, each orifice is passed by a flight at a rate of at least about 0.5 passes per second, more preferably at least about 1 pass per second, more preferably at least about 1.5 passes per second, and more preferably still at least about 2 passes per second. In preferred embodiments, orifices 54 are positioned at a distance of from about 15 to about 30 barrel diameters from the beginning of the screw (at upstream end 34).

Referring again to FIG. 1, downstream of region 50 is a nucleator 66 constructed to include a pressure-drop nucleating pathway 67. As used herein, "nucleating pathway" in the context of rapid pressure drop is meant to define a pathway that forms part of microcellular polymer foam extrusion apparatus and in which, under conditions in which the apparatus is designed to operate (typically at pressures of from about 1500 to about 30,000 psi upstream of the nucleator and at flow rates of greater than about 5 lbs polymeric material per hour), the pressure of a single-phase solution of polymeric material admixed with blowing agent in the system drops below the saturation pressure for the particular blowing agent concentration at a rate or rates facilitating nucleation. Nucleating pathway 67 includes an inlet end 69 for receiving a single-phase solution of polymeric material precursor and blowing agent as a fluid polymeric stream, and a nucleated polymer releasing end 70 for delivering nucleated polymeric material to molding chamber, or mold, 37. Nucleator 66 is constructed and arranged to subject a mixture, preferably a single-phase solution, of polymeric material and blowing agent passing therethrough to a pressure drop rate of at least about 0.1 GPa/sec. In preferred embodiments, the nucleator subjects the mixture to a pressure drop at a rate of at least about 0.3 GPa/sec, more preferably at least about 0.5 GPa/sec, and more preferably at least about 1 GPa/sec. In some embodiments very high pressure drop rates can be induced such as 3, 5, or 7 GPa/sec. Nucleators can be selected by those of ordinary skill in the art on the basis of this disclosure and international publications referenced above to create desired pressure drop rates. Nucleator 66 can be located in a variety of locations downstream of region 50 and upstream of mold 37. In a preferred embodiment, nucleator 66 is located in direct fluid communication with mold 37, such that the nucleator defines a nozzle connecting the extruder to the molding chamber and the nucleated polymer releasing end 70 defines an orifice of molding chamber 37. According to one set of embodiments, the invention lies in placing a nucleator upstream of a mold. In continuous extrusion embodiments, nucleator 66 may empty directly into a shaping die, or may form an integral part of a shaping die. In systems embodying blow molding polymer processing apparatus, the nucleator may empty into an annular die designed to form a parasin that later is blow molded, or may form an integral part of an annular die.

Nucleator 66 may include a nucleating pathway 67 constructed and arranged to have a variable cross-sectional dimension, that is, a pathway that can be adjusted in cross-section. A variable cross-section nucleating pathway allows the pressure drop rate in a stream of fluid polymeric material passing therethrough to be varied in order to achieve a desired nucleation density.

In one embodiment, a nucleating pathway that changes in cross-sectional dimension along its length is used. In particular, a nucleating pathway that decreases in cross-sectional dimension in a downstream direction can significantly increase pressure drop rate. The and other exemplary nucleators are described in international patent publication WO 98/08667, referenced above.

In injection molding embodiments a charge of polymeric material/blowing agent mixture (preferably a single-phase solution) can be accumulated in an accumulator, then injected into a mold and, during injection, nucleated. The accumulator can define a distal region of an extruder barrel where a reciprocating screw is utilized, or a separate accumulator (not shown) can be connected to the barrel of the extruder, material can be introduced into the accumulator from the barrel, and material can be injected from the accumulator into the mold. Such arrangements are described in international patent publication WO 98/31521, referenced above.

As mentioned, the invention involves production of microcellular material with very low levels of blowing agent. Specifically, polymeric material is conveyed downstream in polymer processing apparatus such as that shown in FIG. 1 while introducing into the polymeric material blowing agent in an amount of less than about 0.08% by weight based on the weight of the polymer/blowing agent mixture. In other embodiments the blowing agent can be present in the mixture in an amount of less than about 0.065% by weight, or less than about 0.05% by weight, or less than about 0.04% by weight, or even less than about 0.03% by weight.

Success in forming polymeric microcellular materials with such low blowing agent levels is surprising. It is surprising that at blowing agent levels significantly below 0.1% sufficient nucleation occurs to achieve small cells, even through the use of nucleating agents. In conventional (non-microcellular) polymer foaming, the use of nucleating agents in combination with very low blowing agent levels typically does not give small cells. However, in the case of microcellular polymeric foaming at very low gas levels such as those described herein, in combination optionally with nucleating agents and at high pressure drop rates associated with microcellular foaming, good microcellular product is obtained.

System 30, and other systems, can be designed to form a mixture of blowing agent and polymeric material, preferably a single-phase solution, and transfer it downstream at a rate of at least about 10 lbs/hr. In other embodiments the apparatus can transfer the mixture downstream at a rate of at least about 20, 40, or 60 lbs/hr. These rates can occur continuously such as in continuous extrusion, or intermittently such as in injection molding. These relatives high flow rates can be achieved where a screw including a mixing section 60 vigorously mixes blowing agent (preferably supercritical blowing agent) with polyinuously such as in continuous extrusion, or intermittently such as in injection molding. These relatives high flow rates can be achieved where a screw including a mixing section 60 vigorously mixes blowing agent (preferably supercritical blowing agent) with polymeric material. Preferably, the blowing agent is introduced into the polymeric material and, in a period of less than about 10 minutes after injection of blowing agent, the blowing agent forms part of a single-phase solution of polymeric material and blowing agent. Preferably, the single-phase solution is formed in a period of less than about 5 minutes, more preferably less than about 1 minutes, more preferably still less than about 30 seconds. To maintain a non-nucleated, single-phase solution after mixing and prior to nucleation, the blowing agent/polymer mixture, downstream of the injection location and upstream of the nucleator, is kept under pressure varying by no more than about 1500 psi. More preferably, the pressure in this region varies by no more than about 2500 psi.

This surprising ability to obtain sufficient nucleation at such low blowing agent levels may be explained as follows. While not wishing to be bound by any theory, the inventors believe that nucleation capability of nucleating agent present in the material may be enhanced by the presence of shear field associated with high pressure drop rates. Moreover, as lower blowing agent levels are used, there is less interconnection of cells and small cell size is maintained. The lower interconnection is the result of less blowing agent available for rapid cell growth (higher blowing agent levels may cause cells to impinge upon each other and coalesce or interconnect).

It is a feature of the invention that lower blowing agent levels also provides better surface properties in microcellular product since there is less blowing agent to diffuse out of the material and interfere with surface appearance.

The invention also provides a system and method to produce foam molded parts with surfaces replicating solid parts. At least a portion of the surface of these parts is free of splay and swirl visible to the naked human eye. Extremely smooth molded parts can be produced when the temperature of the melt and mold temperature and a blowing agent concentration is optimized to allow blowing agent to diffuse away from the surface of the part so that the surface includes a skin layer essentially free of cells. This skin layer is essentially solid polymer, thus the part appears as a solid polymeric part to the unaided human eye. Splay and a swirl, in foamed polymeric material, is caused by bubbles at the surface being dragged against a mold wall. Where bubbles at the surface are removed, due to temperature control, splay and a swirl is avoided. In these embodiments molded parts are produced having an outer skin of essentially solid polymeric material free of cells, having a thickness at least three times the average cell size of the foam material. Preferably, the outer skin thickness is at least about five times the average cell size of the material. Another reason that molded parts can be produced, according to the invention, that are free of visible splay and swirl is that the diffusion rate of a supercritical fluid blowing agent is believed by the inventors to be more rapid than that of typical blowing agents, allowing diffusion at the surface of the article to occur, as described, to form a solid skin layer.

Figure 3:
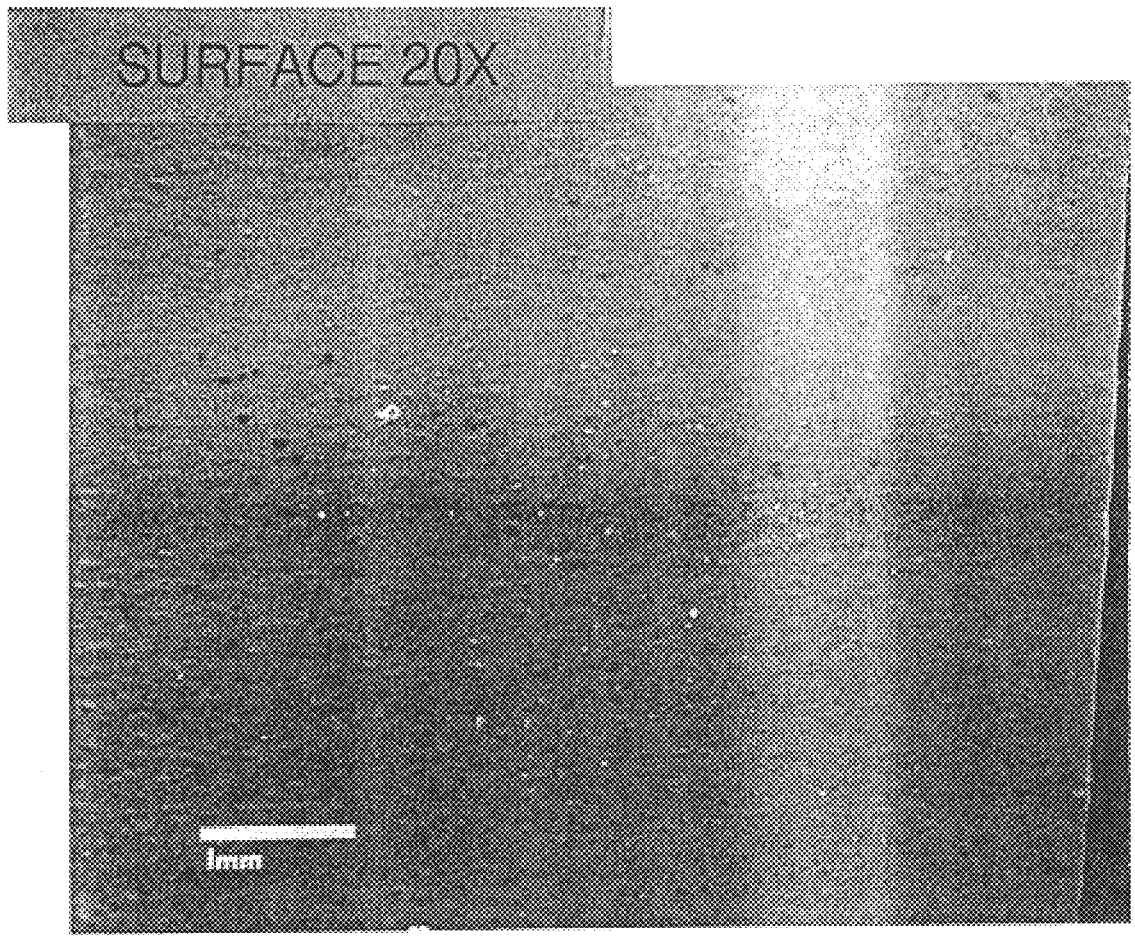
FIG. 3 is a photocopy of a scanning electron micrograph (SEM) image of a surface of extruded microcellular material at 20× magnification.
Figure 4:
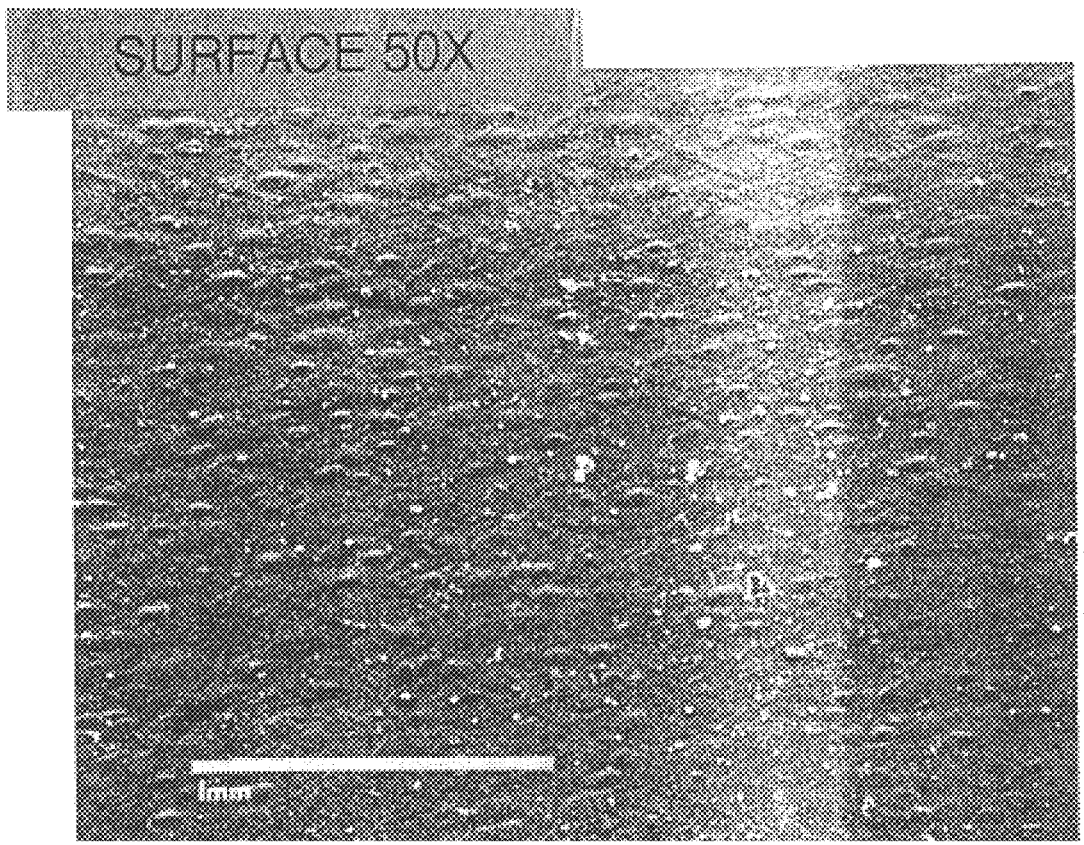
FIG. 4 is a photocopy of an SEM image of the article of FIG. 3, at 50× magnification.
Figure 5:
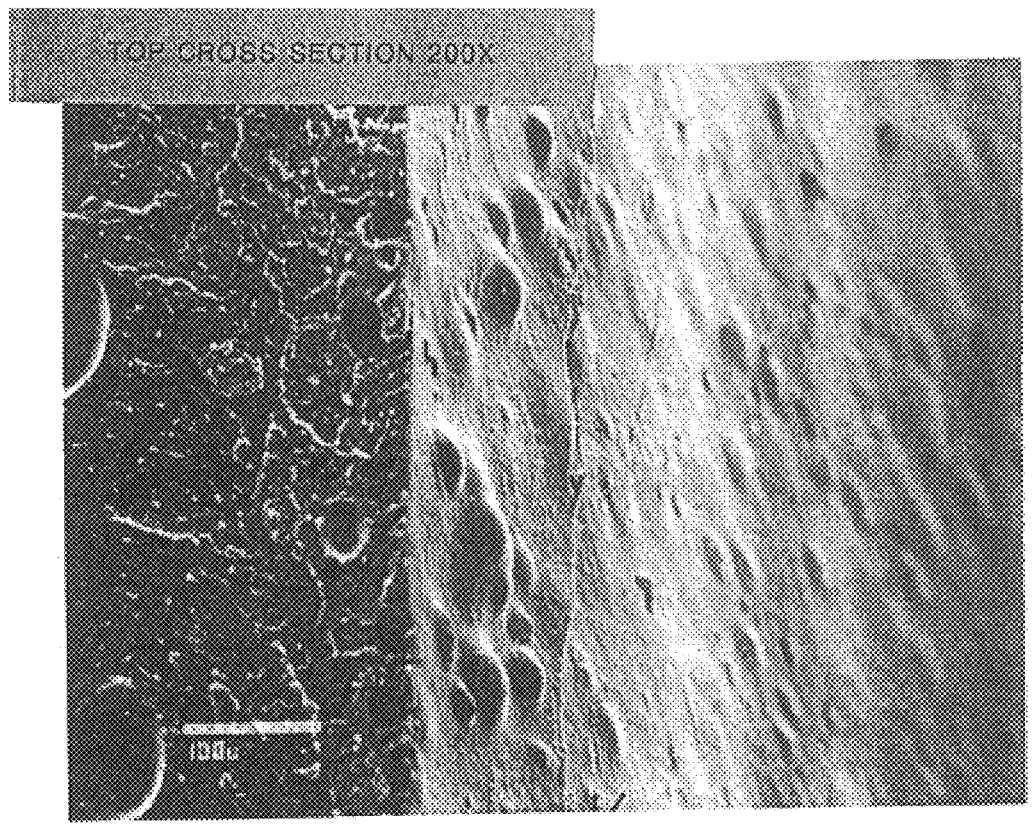
FIG. 5 is a photocopy of an SEM image of a portion of a cross-section of the article of FIGS. 3 and 4, and a portion of the surface of the article as it meets the cross-section, at 200× magnification.
Figure 5:
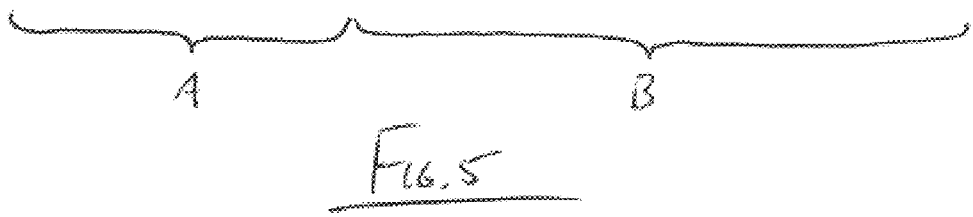

Specifically, extruded, injection molded, and blow-molded microcellular articles of the invention can be produced having a smooth surface free of surface defects visible to the unaided human eye (i.e., without the use of an optical microscope or other instrumentation). The articles are free of surface defects that cause the surface to deviate from a plane by more than 100 microns. Preferably, the articles are free of surface defects that cause the surface to deviate from a plane by more than 75 microns, 50 microns, 40 microns, or more preferably still 30 microns. This description would be understood by those of ordinary skill in the art and, in addition, an understanding is assisted with reference to FIGS. 3–5, which correspond to Example 1, below. FIGS. 3 and 4 are SEM images at 20× and 50× magnification, respectively, of an extruded sheet. FIG. 5 is an SEM image of the same sheet in cross-section, at 200× magnification. The image of FIG. 5 includes a region A, which is an image of a portion of the cross-section itself, and a region B, which is of the surface of the article perpendicular to (and extending away from in FIG. 5) the cross-section. The boundary between regions A and B is an edge where the cross-section meets the surface. As can be seen from FIGS. 3–5, the techniques of the invention result in microcellular articles having particularly smooth surfaces, free of visible splay and swirl and free of large surface defects, as described herein.

Prior to the disclosure herein, it would have been expected that at blowing agent levels appreciably below 0.1%, e.g. at about 0.08% or less, product cell size would have increased to unacceptable levels, and void volume of the material would have decreased, eventually approaching zero—solid material (in a relative sense, 0.08% by weight blowing agent is significantly below 0.1% blowing agent level). See, for example *Introduction to Structural Foam*, Semerdjiev, Society of Plastics Engineers, Inc. (1982), pg. 17, incorporated herein by reference. However, one aspect of the invention involves the discovery that this is not the case, i.e. microcellular material can be formed, at void volume levels noted herein, at blowing agent levels at or below about 0.08%. It is proposed that this minimum is driven by limited cell growth due to insufficient driving force for cell expansion. That is, nucleation occurs, then very limited cell growth occurs due to insufficient gas for large cells to be formed. While many prior art studies (e.g. U.S. Pat. No. 4,473,665, discussed above) were concerned with rapidly freezing nucleated molten polymer material to arrest cell growth, the extremely low levels of blowing agent in accordance with the present invention reduce or obviate this need because there is insufficient blowing agent to cause significant cell growth.

The function and advantage of these and other embodiments of the present invention will be more fully understood from the examples below. The following examples are intended to illustrate the benefits of the present invention, but do not exemplify the full scope of the invention.

EXAMPLE 1

Use of Low Level of Blowing Agent for Extrusion of Microcellular Foamed PVC Profile.

A 70 mm IDE counter-rotating twin screw extruder with modified barrel and special screw design was used to produce the microcellular foamed profile. The barrel was lengthened 8D (8×70, or 560 mm) to a length to diameter ratio of 30:1. The counter-rotating screws were modified according to microcellular foam design principles to provide sufficient pressure at the point of nitrogen injection and to disperse the nitrogen uniformly throughout the polymer melt stream.

A calcium carbonate filled, non-plasticized poly (vinylchloride) formulation having a standard lubricant package and a solid density of 1.46 g/cc was charged to the hopper of the extruder. The screws were rotated at a rate of 19 revolutions per minute to give a throughput of 75 kg/hr.

Nitrogen gas under pressure was injected into the barrel through 2 injection ports, one placed in each side of the barrel. The injectors each consisted of an assembly having 175 holes of 0.5 mm diameter. A gas pumping and metering system was used to control the flow of nitrogen to 0.035 kg/hr, making the nitrogen level 0.047% by weight of the polymer. The pressure immediately after the point of gas injection was measured using a pressure transducer to be 144 bar (2200 psi). The pressure at the end of the extruder was similarly measured to be 255 bar (4200 psi). The temperature of the polymer melt stream at that point was measured using a melt temperature probe to be 188 C. (370 F.).

The extrudate was calibrated to desired dimensions using standard dry calibration (vacuum) technology. Product dimensions were approximately 100 mm wide by 10 mm in height. Wall thicknesses were about 0.4 to 0.5 mm. The profile was then measured using a Perkin Elmer densimeter to have an average cross sectional density of 1.24 g/cc, a reduction of 15% from the solid. Scanning electron microscopy was performed on a sample fractured in liquid nitrogen and coated with gold to reveal the cell structure of the foam. The average cell diameter was measured to be between 35 and 45 microns, depending on the location of the sample on the product.

FIGS. 3–5 are SEM images of product produced according to this Example, as described above.

EXAMPLE 2

Injection Molding Polyamide 6 with a Low Level of Blowing Agent

A two stage injection molding machine (Engel manufacture) with a 32:1 l/d, 40 mm plasticizing unit feeding melted polymer into a 40 mm diameter plunger was used to process a 40% glass and mineral filled polyamide 6. The plunger and plasticizing units were connected by a spring loaded ball check joiner assembly and the plunger injects into a mold through a typical pneumatically driven shut-off nozzle. While plasticizing the polymer, 0.08% by weight of nitrogen in a supercritical state was injected into the plasticizing unit at approximately 18 diameters from the feed section. This was accomplished using one radially positioned port containing 176 orifices of 0.02 inch diameter and an actuated control valve to meter a mass flow rate of blowing agent at a rate of 0.04 lbs/hr.

The homogeneous single phase solution of polymer and supercritical nitrogen was maintained under a pressure of at least 2000 psi during the entire cycle to maintain the single phase solution. The single phase solution was injected into a small trim piece with cold runner at an injection speed of 5.0 inches/second and a hydraulic pressure of 1209 psig. The parts and runner produced had a weight of 109.5 grams, 5% less than the weight of the solid parts and runner. The cell structure of these parts was less than 40 microns in diameter.

EXAMPLE 3

Injection Molding Polyamide 6 with a Low Level of Blowing Agent

The material used in Example 2 was processed in a reciprocating screw injection molding machine (Engel manufacture) with a 32:1 l/d, 105 mm plasticizing unit that also served as the injection plunger. While plasticizing the polymer, 0.06% by weight of nitrogen in a supercritical state was injected into the plasticizing unit at 20 diameters from the feed section. This was accomplished using one radially positioned port containing 176 orifices of 0.02 inch diameter and an actuated control valve to meter a mass flow rate of blowing agent at a rate of 0.60 lbs/hr.

The homogeneous single phase solution of polymer and supercritical nitrogen was maintained under a pressure of at least 2000 psi during the entire cycle to maintain the single phase solution. The single phase solution was injected into a two cavity trim bezel through a cold runner system and subgates at an injection speed of 5.3 inches/second and a hydraulic pressure of 2333 psig. The parts and runner produced had a weight of 654.4 grams, 15% less than the weight of the solid parts and runner. The cell structure of these parts was less than 40 microns in diameter.

EXAMPLE 4

Injection Molding Polyamide 6/6 with a Low Level of Blowing Agent

A 15% glass fiber, 25% mineral filled polyamide 6/6 was processed in a reciprocating screw injection molding machine (Engel manufacture) with a 32:1 l/d, 105 mm plasticizing unit that also served as the injection plunger. While plasticizing the polymer, 0.07% by weight of nitrogen in a supercritical state was injected into the plasticizing unit at 20 diameters from the feed section. . This was accomplished using one radially positioned port containing 176 orifices of 0.02 inch diameter and an actuated control valve to meter a mass flow rate of blowing agent.

The homogeneous single phase solution of polymer and supercritical nitrogen was maintained under a pressure of at least 2000 psi during the entire cycle to maintain the single phase solution. The single phase solution was injected into a two cavity mirror bracket mold with cold runner system at an injection speed of 3.5 inches/second and a hydraulic pressure of 2149 psig. The parts produced had a weight of 304 grams, 7.0% less than the weight of the solid parts. The cell structure of these parts was less than 40 microns in diameter.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described. In the claims the words "including", "carrying", "having", and the like mean, as "comprising", including but not limited to.

What is claimed is:

1. A method of forming a microcellular article comprising:

conveying polymeric material in a downstream direction in a polymer processing apparatus;

introducing a blowing agent that is a gas under ambient conditions into the polymeric material by metering mass of the blowing agent and creating a mixture of the polymeric material and the blowing agent, the blowing agent present in the mixture in amount of less than about 0.08% by weight; and forming a microcellular article from the polymeric material, the microcellular article having an average cell size and including an outer skin of essentially solid polymeric material having a thickness of at least three times the average cell size of the microcellular article.

2. A method as in claim 1, wherein the blowing agent is present in the mixture in an amount of less than about 0.065% by weight.

3. A method as in claim 1, wherein the blowing agent is present in the mixture in an amount of less than about 0.05% by weight.

4. A method as in claim 1, wherein the blowing agent is present in the mixture in an amount of less than about 0.04% by weight.

5. A method as in claim 1, wherein the blowing agent is present in the mixture in an amount of less than about 0.03% by weight.

6. A method as in claim 1, wherein the microcellular article includes residual chemical blowing agent or reaction by-product of chemical blowing agent in an amount less than that inherently found in articles blown with about 0.1 percent by weight chemical blowing agent or more.

7. A method as in claim 6, further comprising forming a single-phase solution of the blowing agent and polymeric material.

8. A method as in claim 7, comprising nucleating the single-phase solution by subjecting the solution to conditions of solubility change to form nucleation sites therein.

9. A method as in claim 8, comprising subjecting the single-phase solution to a rapid pressure drop.

10. A method as in claim 9, comprising subjecting the single-phase solution to a pressure drop at a pressure drop rate of at least about 0.1 GPa/sec.

11. A method as in claim 9, comprising subjecting the single-phase solution to a pressure drop at a pressure drop rate of at least about 1 GPa/sec.

12. A method as in claim 9, involving subjecting the single-phase solution to a pressure drop at a pressure drop rate sufficient to create sites of nucleation at a density of at least about $10^6$ sites/cm$^3$.

13. A method as in claim 9, comprising continuously nucleating the single-phase solution by passing the single-phase solution through a nucleator comprising a restriction.

14. A method as in claim 7, comprising conveying the single-phase solution within the polymer processing apparatus at a rate of at least about 20 lbs/hr.

15. A method as in claim 7, comprising introducing the blowing agent into the polymeric material flowing in the polymer processing apparatus at a rate of at least about 10 lbs./hr. and, in a period of less than about one minute, creating the single-phase solution.

16. A method as in claim 7, involving providing an extruder barrel containing an extruder screw, the barrel having an orifice connected to a source of blowing agent, and injecting the blowing agent through the orifice into the barrel while rotating the screws such that each orifice is passed by a flight of the screw, and is thereby closed and reopened by the flight at a rate of at least 0.5 passes per second.

17. A method as in claim 7, comprising providing an extruder barrel containing an extruder screw, the barrel including at least about 100 orifices connected to a source of the blowing agent, and injecting the blowing agent through the orifices into the barrel while rotating the screw within the barrel.

18. A method as in claim 1, comprising introducing the blowing agent into the polymeric material at an injection location of the apparatus and maintaining the mixture, downstream of the injection location and upstream of a nucleation region of the apparatus, under pressure varying by no more than about 1500 psi.

19. A method as in claim 1, comprising forming the microcellular article having cells of average size less than about 50 microns.

20. A method as in claim 1, comprising forming the microcellular article having cells of average size less than about 100 microns.

21. A method as in claim 1, comprising forming the microcellular article having cells of average size less than about 20 microns.

22. A method as in claim 1, comprising forming the microcellular article having a void volume of at least about 5%.

23. A method as in claim 1, comprising forming the microcellular article having a void volume of at least about 10%.

24. A method as in claim 1, comprising forming the microcellular article having a void volume of at least about 15%.

25. A method as in claim 1, comprising forming the microcellular article having a void volume of at least about 20%.

26. A method as in claim 1, comprising forming the microcellular article having a void volume of at least about 30%.

27. A method as in claim 1, comprising forming the microcellular article having a void volume of at least about 50%.

28. A method as in claim 1, the forming step comprising continuously extruding the microcellular article.

29. A method as in claim 1, the forming step comprising molding the microcellular article.

30. A method as in claim 1, the forming step comprising blow-molding the microcellular article.

31. A method as in claim 1, the forming step comprising injection molding the microcellular article.

32. A method as in claim 31, comprising accumulating the mixture in an accumulator connected to a molding chamber, and injecting the mixture from the accumulator into the molding chamber to form the microcellular article.

33. A method as in claim 31, comprising accumulating a single-phase solution of the blowing agent and polymeric material in the accumulator and injecting the single-phase solution from the accumulator into the molding chamber while nucleating the single-phase solution.

34. A method as in claim 33, comprising nucleating the single-phase solution at a nucleation rate sufficient to create at least about $10^6$ nucleation sites/cm$^3$.

35. A method as in claim 31, comprising forming a single-phase solution of the blowing agent and polymeric material and injecting the single-phase solution into a mold while nucleating the single-phase solution.

36. A method as in claim 32, wherein the accumulator is positioned within a barrel of an extruder downstream of a polymer processing screw.

37. A method as in claim 32, wherein the polymer processing apparatus includes an extruder barrel containing an extruder screw, and the accumulator is separate from the extruder barrel and connected to the extruder barrel.

38. A method as in claim 1, wherein the blowing agent comprises atmospheric gas.

39. A method as in claim 1, wherein the blowing agent comprises carbon dioxide.

40. A method as in claim 1, wherein the blowing agent consists of carbon dioxide.

41. A method as in claim 40, comprising introducing the carbon dioxide into the polymeric material to create the mixture and maintaining the mixture under conditions in which the carbon dioxide is a supercritical fluid.

42. A method as in claim 39, comprising introducing the carbon dioxide into the polymeric material to create the mixture and maintaining the mixture under conditions in which the carbon dioxide is a supercritical fluid.

43. A method as in claim 1, comprising introducing the blowing agent into the polymeric material to create the mixture and maintaining the mixture under conditions in which the blowing agent is a supercritical fluid.

44. A method as in claim 1, comprising forming a microcellular article containing residual chemical blowing agent, or reaction by-product of chemical blowing agent in an amount less than that inherently found in articles blown with 0.1% by weight chemical blowing agent or more.

45. A method as in claim 1, comprising forming a microcellular article containing residual chemical blowing agent, or reaction by-product of chemical blowing agent in an amount less than that inherently found in articles blown with 0.05% by weight chemical blowing agent or more.

46. A method as in claim 1, comprising forming a microcellular article containing residual chemical blowing agent, or reaction by-product of chemical blowing agent in an amount less than that inherently found in articles blown with 0.01% by weight chemical blowing agent or more.

47. A method as in claim 1, comprising forming a microcellular article containing residual chemical blowing agent, or reaction by-product of chemical blowing agent in an amount less than that inherently found in articles blown with 0.005% by weight chemical blowing agent or more.

48. A method as in claim 1, comprising forming the microcellular article essentially free of residual chemical blowing agent or reaction by-product of chemical blowing agent.

49. A method as in claim 1, comprising forming a microcellular polymeric article having a smooth surface free of surface defects that cause the surface to deviate from a plane by more than 100 microns.

50. A method as in claim 1, comprising forming a microcellular polymeric article having a smooth surface free of surface defects that cause the surface to deviate from a plane by more than 50 microns.

51. A method as in claim 1, comprising forming a microcellular polymeric article having a smooth surface free of surface defects that cause the surface to deviate from a plane by more than 30 microns.

52. A method as in claim 1, comprising nucleating the mixture of the polymeric material and the blowing agent while injecting the mixture into a mold to form the article.

53. A method of forming a microcellular article comprising:
   conveying polymeric material in a downstream direction in a polymer processing apparatus;
   introducing a blowing agent that is a gas under ambient conditions into the polymeric material by metering mass of the blowing agent and creating a mixture of the polymeric material and the blowing agent, the blowing agent present in the mixture in amount of less than about 0.08% by weight; and
   forming a microcellular article from the polymeric material, the microcellular article having a surface free of surface defects that cause the surface to deviate from a plane by more than 100 microns.

54. A method as in claim 53, wherein the blowing agent is present in the mixture in an amount of less than about 0.065% by weight.

55. A method as in claim 53, wherein the blowing agent is present in the mixture in an amount of less than about 0.05% by weight.

56. A method as in claim 53, wherein the blowing agent is present in the mixture in an amount of less than about 0.04% by weight.

57. A method as in claim 53, wherein the blowing agent is present in the mixture in an amount of less than about 0.03% by weight.

58. A method as in claim 53, further comprising forming a single-phase solution of the blowing agent and polymeric material.

59. A method as in claim 58, comprising subjecting the single-phase solution to a rapid pressure drop.

60. A method as in claim 58, comprising subjecting the single-phase solution to a pressure drop at a pressure drop rate of at least about 0.1 GPa/sec.

61. A method as in claim 60, involving subjecting the single-phase solution to a pressure drop at a pressure drop rate sufficient to create sites of nucleation at a density of at least about $10^6$ sites/cm$^3$.

62. A method as in claim 60, comprising continuously nucleating the single-phase solution by passing the single-phase solution through a nucleator comprising a restriction.

63. A method as in claim 53, comprising forming the microcellular article having cells of average size less than about 50 microns.

64. A method as in claim 53, comprising forming the microcellular article having cells of average size less than about 100 microns.

65. A method as in claim 53, comprising forming the microcellular article having cells of average size less than about 20 microns.

66. A method as claim 53, comprising forming the microcellular article having a void volume at least about 5%.

67. A method as in claim 53, comprising forming the microcellular article having a void volume of at least about 20%.

68. A method as in claim 53, comprising forming the microcellular article having a void volume of at least about 50%.

69. A method as in claim 53, the forming step comprising continuously extruding the microcellular article.

70. A method as in claim 53, the forming step comprising blow-molding the microcellular article.

71. A method as in claim 53, the forming step comprising injection molding the microcellular article.

72. A method as in claim 71, comprising nucleating the mixture of the polymeric material and the blowing agent while injecting the mixture into a mold.

73. A method as in claim 53, wherein the blowing agent comprises atmospheric gas.

74. A method as in claim 73, wherein the blowing agent comprises carbon dioxide.

75. A method as in claim 53, comprising forming a microcellular article containing residual chemical blowing agent, or reaction by-product of chemical blowing agent in an amount less than that inherently found in articles blown with 0.1% by weight chemical blowing agent or more.

76. A method as in claim 53, comprising forming the microcellular article essentially free of residual chemical blowing agent or reaction by-product of chemical blowing agent.

77. A method as in claim 53, comprising forming a microcellular polymeric article having a surface and free of surface defects that cause the surface to deviate from a plane by more than 50 microns.

78. A method as in claim 53, comprising forming a microcellular polymeric article having a surface free of surface defects that cause the surface to deviate from a plane by more than 30 microns.

79. A method as in claim 53, comprising forming a microcellular polymeric article including an outer skin of essentially solid polymeric material having a thickness of at least three times the average cell size of the microcellular article.

80. A method as in claim 1, comprising forming a microcellular polymeric article including an outer skin of essentially solid polymeric material having a thickness of at least five times the average cell size of the microcellular article.

81. A method as in claim 1, wherein the polymeric material is PVC.

82. A method as in claim 53, wherein the polymeric material is PVC.

83. A method as in claim 1, wherein the blowing agent comprises nitrogen.

84. A method as in claim 53, wherein the blowing agent comprises nitrogen.

85. A method as in claim 1, wherein the polymeric material is polyethylene.

86. A method as in claim 53, wherein the polymeric material is polyethylene.

* * * * *